US007720087B2

(12) United States Patent
Jones et al.

(10) Patent No.: US 7,720,087 B2
(45) Date of Patent: May 18, 2010

(54) METHOD AND SYSTEM FOR CHANNEL MANAGEMENT IN A VOICE RESPONSE SYSTEM

(75) Inventors: Nigel L. Jones, Eastleigh (GB); Bernard Zdzislaw Kufluk, Southampton (GB); Philip Noel, North Baddesley (GB); David Robnett Vyvyan, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1245 days.

(21) Appl. No.: 11/255,202

(22) Filed: Oct. 20, 2005

(65) Prior Publication Data

US 2006/0104307 A1 May 18, 2006

(30) Foreign Application Priority Data

Nov. 17, 2004 (GB) ................... 0425298.7

(51) Int. Cl.
*H04J 3/16* (2006.01)
*H04J 3/17* (2006.01)
*H04J 3/18* (2006.01)
*H04L 12/43* (2006.01)

(52) U.S. Cl. .............. 370/437; 370/433; 370/459; 370/465; 370/468; 370/477

(58) Field of Classification Search .................. None
See application file for complete search history.

(56) References Cited

U.S. PATENT DOCUMENTS

| 6,366,879 | B1 | 4/2002 | Coxhead et al. |
| 6,643,262 | B1 * | 11/2003 | Larsson et al. .............. 370/236 |
| 6,694,148 | B1 * | 2/2004 | Frodigh et al. .............. 455/522 |
| 2003/0083880 | A1 | 5/2003 | Sabara et al. |
| 2003/0114166 | A1 * | 6/2003 | Franz et al. .................. 455/453 |
| 2006/0075399 | A1 * | 4/2006 | Loh et al. .................... 717/174 |

* cited by examiner

*Primary Examiner*—Kwang B Yao
*Assistant Examiner*—Jutai Kao
(74) *Attorney, Agent, or Firm*—David A. Mims, Jr.

(57) ABSTRACT

A method and system for managing channels in a voice response system is provided. The method comprises periodically monitoring utilization of a system resource and determining a number, N, of voice channels required to be quiesced based on the utilization level of the system resource. This number is compared with the number of channels currently quiescing, Q, and the number of quiescing channels is adjusted accordingly. A quiescing channel is disabled when it becomes inactive.

4 Claims, 3 Drawing Sheets

FIG. 3a $t_1$

| Ch. | State | | | |
|---|---|---|---|---|
| 1 | A | | 1 | Q |
| 2 | A | N= 4 | 2 | A |
| 3 | A | | 3 | A |
| 4 | A | | 4 | A |
| 5 | A | | 5 | A |
| 6 | A | → | 6 | A |
| 7 | A | | 7 | Q |
| 8 | A | | 8 | A |
| 9 | A | | 9 | Q |
| 10 | A | | 10 | A |
| 11 | A | | 11 | Q |
| 12 | A | | 12 | A |

| | | | | |
|---|---|---|---|---|
| 1 | D | | 1 | A |
| 2 | A | N= -2 | 2 | A |
| 3 | A | | 3 | A |
| 4 | A | | 4 | A |
| 5 | A | | 5 | A |
| 6 | A | → | 6 | A |
| 7 | Q | | 7 | A |
| 8 | A | | 8 | A |
| 9 | D | | 9 | A |
| 10 | A | | 10 | A |
| 11 | D | | 11 | D |
| 12 | A | | 12 | A |

| | | | | |
|---|---|---|---|---|
| 1 | A | | 1 | Q |
| 2 | A | N = 6 | 2 | Q |
| 3 | A | | 3 | Q |
| 4 | A | | 4 | Q |
| 5 | A | | 5 | Q |
| 6 | A | → | 6 | Q |
| 7 | A | | 7 | A |
| 8 | A | | 8 | A |
| 9 | A | | 9 | A |
| 10 | A | | 10 | A |
| 11 | D | | 11 | D |
| 12 | A | | 12 | A |

| | | | | |
|---|---|---|---|---|
| 1 | D | | 1 | A |
| 2 | Q | N= -5 | 2 | A |
| 3 | D | | 3 | A |
| 4 | Q | | 4 | A |
| 5 | D | | 5 | A |
| 6 | D | → | 6 | A |
| 7 | A | | 7 | A |
| 8 | A | | 8 | A |
| 9 | A | | 9 | A |
| 10 | A | | 10 | A |
| 11 | D | | 11 | A |
| 12 | A | | 12 | A |

Q = 2     Q = 0

METHOD AND SYSTEM FOR CHANNEL MANAGEMENT IN A VOICE RESPONSE SYSTEM

FIELD OF THE INVENTION

The present invention relates to a method and system for managing channels in a voice response system.

BACKGROUND OF THE INVENTION

Interactive Voice Response (IVR) systems are an important tool for customer relationship management and play a critical role in providing information and features to existing and potential business customers who use the telephone as an interface to an enterprise. IVR systems allow efficient exchange of information with reduced human interaction.

An Interactive Voice Response, also known as a Voice Response Unit, is a computer application that allows callers to interact with a communications system over the telephone. The IVR answers a call by playing one or more pre-recorded messages or scripts. The messages usually prompt the caller to provide input either verbally or by pressing touchtone keys. The IVR supplies the caller with information based on the responses. Examples of well known uses of IVR systems include automated answering services, electronic voice mail, automated ticket ordering or recorded timetable information.

In a multi-channel IVR system, data used by the IVR to respond to a caller is often stored in a database accessible by a data processing system on which runs the IVR applications. The dialogs that control the interaction between a caller and the data can be provided in many different application programming environments including Java™, (Java is a trade mark of Sun Corporation), and VoiceXML (Voice extensible Markup Language), as well as state tables. It has been found that multi-channel IVR systems, especially those using Java and VoiceXML, can easily become overloaded. At present, when a critical system load is detected channels are disabled to protect the system. Manual intervention is then usually required to return the system to a working state.

One system which attempts to overcome the problem of overloading a multi-channel IVR is described in US 2003/0114166. This system employs a switching centre to control an external switching technology resource. The switching centre is controlled so as to block and release ports between the switching centre and the external resource according to a capacity utilisation of the resource. This can cause disruption of calls when the channel on which a call is being carried out is suddenly blocked by the switching centre.

The present invention aims to provide an improved system and method for managing load in a telephony system with minimum disruption of calls. Rather than blocking a busy channel, the invention marks channels for disablement, and disables them only once the current call has finished. Preferred features are that the system is stateless, in that it does not need to know details of what it has done before, that it iteratively finds the optimum level of channel/system usage, and that it can work without the need for a separate signalling link, so can thus be used with Channel Associated Signal (CAS) protocols.

The invention can be applied both to systems where all channels are in use, as well as systems that may not be using all channels. For systems in which all channels are in use, one method which can be used to reduce system load is to take actions that increase the effective length of the calls, for example by adding in a waiting message. However, if not all channels are in use, increasing the call length would have the effect of driving new users onto the idle channels, rather than reducing the utilisation of system resources. Indeed, it may have the opposite effect as the system will have to maintain more open dialogs to different users.

IVR systems typically have a limited number of channels which are available, for example 480 channels. At times, for example when a central processing unit, on which an IVR is running, is also carrying out a data backup, a large amount of the processing capacity available is being used to do the backup. Thus there may not be sufficient processing capacity to maintain all 480 channels, and thus a system overload can occur even when the system is not using all channels.

SUMMARY OF THE INVENTION

A first aspect of the present invention provides a method of managing channels in a voice response system. The method comprises monitoring utilisation of a system resource and then based on the utilization level of the system resource deciding to quiesce a number of voice channels. Channels are then selected to quiesce and any of these quiesced channels are disabled when they become inactive.

In one embodiment, the method comprises periodically monitoring utilisation of a system resource and determining a number, N, of voice channels required to be quiesced based on the utilisation level of the system resource. This number is compared with the number of channels currently quiescing, Q, and the number of quiescing channels is adjusted accordingly. A quiescing channel is disabled when it becomes inactive.

A preferred embodiment of the method comprises monitoring utilisation of a system resource, marking one or more active channel(s) for disablement if resource utilization is above a threshold, and disabling a marked channel when it becomes inactive.

The term 'quiesce' is used here to mean the function of making a channel unavailable for new calls. This comprises marking an active channel for disablement and then disabling it as soon as it becomes idle. Thus an active channel which has been quiesced will be disabled at the end of the call on that channel.

A second aspect of the invention provides a voice response system for use with a plurality of voice channels. The system comprises a monitor for monitoring the utilisation of a system resource; and a channel controller operable to periodically determine a number, N, of the voice channels required to be quiesced based on the utilisation level of the system resource; compare the number of channels currently quiescing, Q, with the number, N, that should be quiesced; adjust the number of quiescing channels accordingly; and disable a quiescing channel when it becomes inactive.

A third aspect of the invention provides a channel controller for use in an interactive voice response system. The channel controller is operable to receive a utilisation level of a system resource, and determine a number, N, of voice channels required to be quiesced based on the utilisation level of the system resource. The channel controller can then compare the number of channels currently quiescing, Q, with the number, N, that should be quiesced and adjust the number of quiescing channels accordingly. Additionally, the channel controller disables any quiescing channel which becomes inactive.

BRIEF DESCRIPTION OF THE DRAWINGS

A preferred embodiment of the invention will now be described by way of example only with reference to the drawings in which:

FIGS. 3a to 3d show the states of twelve channels during the method of an example embodiment of the invention.

DETAILED DESCRIPTION OF PREFERRED EMBODIMENTS

Figure 1:
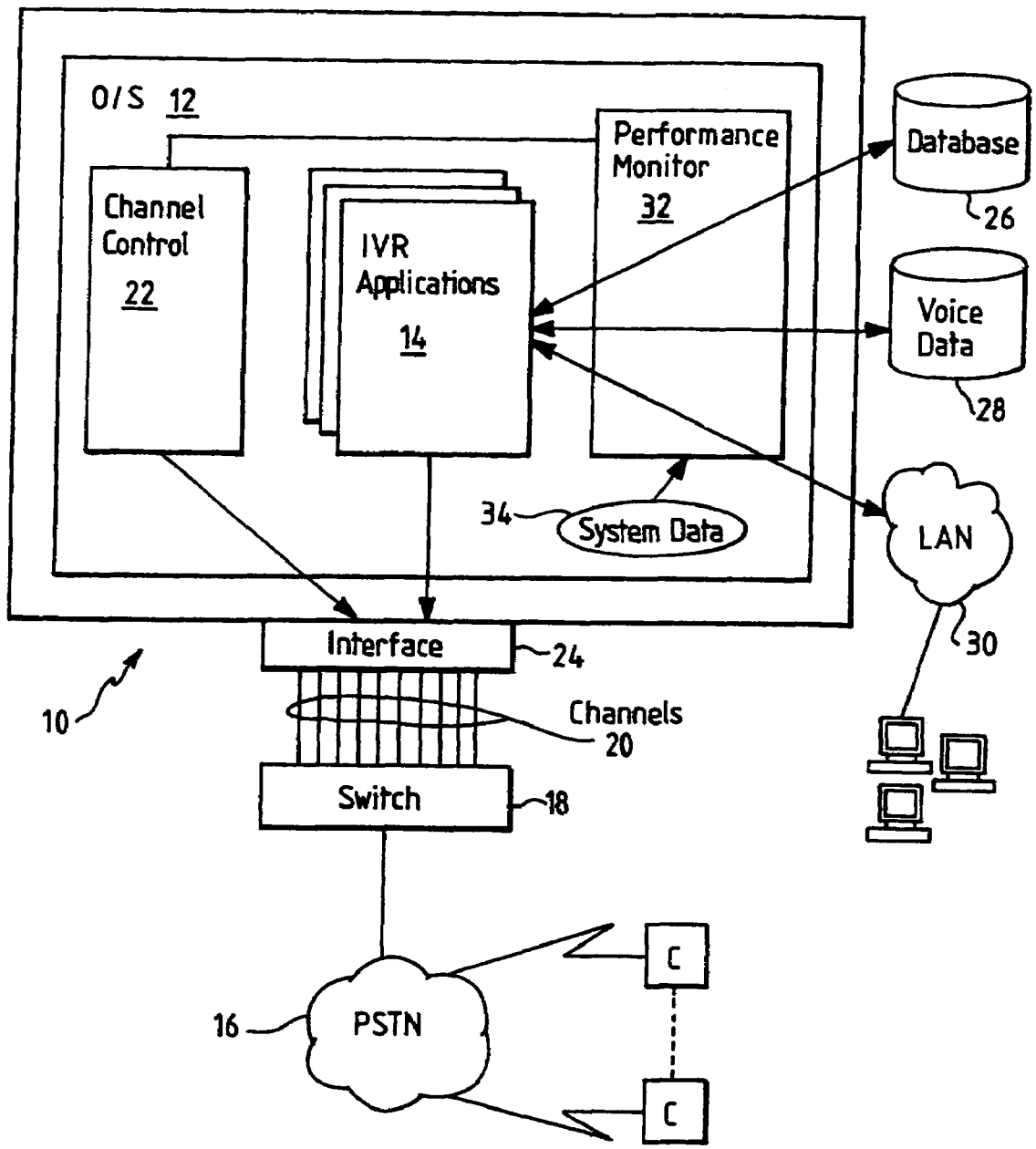
FIG. 1 shows a representation of an example multi-channel call centre in which the present invention may be implemented.

As shown in FIG. 1, a preferred embodiment of the invention is implemented in multi-channel call centre environment comprising a plurality of customers C, a telecommunications network 16, such as a Public Switched Telephone Network (PSTN), a switch 18, and an Interactive Voice Response (IVR) system 10.

The switch 18 transmits calls to and from the telecommunications network and may be, for example, a telephone switching system, a private branch exchange (PBX), a computerised branched exchange (CBX), or a business communications system.

The IVR system comprises a computer system 10 on which an operating system 12 such as AIX® and an Interactive Voice Response application 14, such as WebSphere® Voice Response for AIX, are loaded on start up. (WebSphere and AIX are registered trade marks of IBM Corporation in the US and other countries). The IVR application 14 performs telephony processing functions on telephony channels 20 which are connected through the switch 18 to the telecommunications network.

Each IVR application 14 is capable of retrieving one or more voice segment(s) for playing to a caller from voice data storage 28. A voice segment is typically one minute long and comprises blocks of data. The IVR application will typically request a 4 second sequence of data blocks to fill a system buffer (not shown) and connect to the telephone channels via a telephony interface 24.

The computer system 10 is coupled to a database 26, a voice data store 28, and a computer network 30 and the IVR system also comprises a performance monitor 32 and the channel controller 22. The performance monitor uses system data 34 to monitor the utilisation of various system resources, such as current CPU usage and memory capacity, as well as the number of database or storage transactions being carried out.

The multiple channels may support many types of telecommunication such as telephone email, fax, paging, chat, wireless, and messaging. A caller C rings a number associated with the IVR system which will assign, under the control of the channel control unit 22, a telephony channel 20 to the call and connect with the call. Typically an IVR application 14 will play an introductory voice segment to a call prompting the caller for some input, either in the form of DTMF key presses or speech. The IVR can analyse the key input or speech and then further process the call, possibly supplying the caller with information from the database or from the LAN for example.

Content for delivery to the voice response applications may be obtained from the voice data store, the database or the computer network using Enterprise Java Beans (EJBs), Java Server Programs, or from specialised computer-telephony integration functions (such as fax, or telecomms devices for the deaf), which may be accessed using WVR or legacy state tables. (Java and all Java-based trademarks are trade marks of Sun Microsystems Inc.)

The system has a maximum number of voice channels which are available, for example 480 channels. At times, for example when the computer system 10 is carrying out a data backup, a large amount of the processing capacity available is being used to do the backup. Thus there may not be sufficient processing capacity to maintain all 480 channels.

Figure 2:
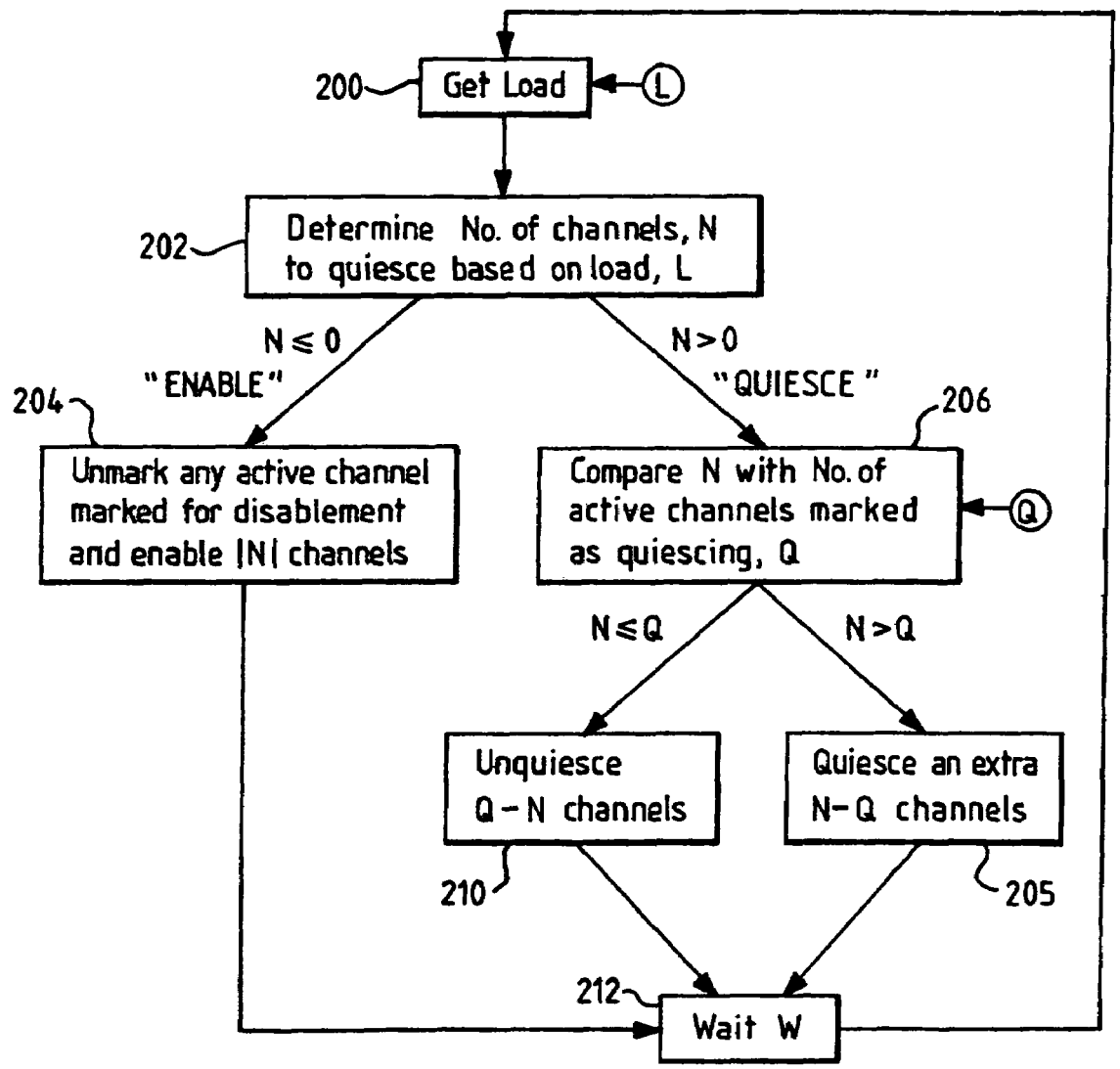
FIG. 2 shows a flowchart of a method of managing voice channels in accordance with an embodiment of the invention.

A method of managing channels using selective channel quiescing when this situation arises will now be described with reference to FIG. 2. The system obtains 200 the performance data 'L' from the performance monitor 32 and uses this to determine 202 a number of channels N which is the number of channels required to be quiesced at that time, based on the current load L. This determination step takes into account a number of factors and can include comparing the utilisation of a system resource to a threshold level of utilization of the resource. If the utilisation is determined to be greater than the threshold, then the system detects that it is in overloaded state and needs to quiesce and then disable extra channels. If the utilization is determined to be below a threshold, the system detects that it may be able to enable some disabled channels.

If N<0, the system has determined that the load is below an optimal level, meaning that it could be processing more calls without overloading. At this time any quiesced channel marked for disablement is unmarked, i.e. unquiesced. This means that at the end of the current call each of these channels will still be available, rather than disabling from service. However, as these channels are already active this unmarking has no affect on the system load—this has not opened any extra channels. So mod(N) disabled channels are enabled 204, making them available to take calls. Enablement of the mod(N) disabled channels should bring the load back up to close to the optimal level.

If N=0, the system load is such that no channels should be enabled and none should be quiesced. Thus any active channels currently marked as quiescing are unmarked so that they remain available at the end of the current call to take more calls.

If N>0, the system has determined that the load is still above an optimal level, and that N channels are required to quiesce, so that they will disable after the end of their current call and this will bring the system resource load down. The next step 206 is to compare N with the number of channels, Q, already quiescing i.e. active but marked for disablement. Q may be less than the number of channels, N', which it was determined were required to quiesce in the previous iteration of the method, because since that previous determination one or more of the marked channels may have disabled at the end of a call.

If N>Q, then N−Q extra channels are to be quiesced 205, and in one example these channels are picked at random from all of the enabled channels.

If N≧Q, then Q−N quiescing channels are unquiesced 210 by unmarking them, so that the total number of channels quiescing is the required number, N.

The system then waits 212 for a predefined period of time, W, and then reassesses its load, L, to see if the load is now at acceptable levels. The system repeats these steps and iteratively adapts the numbers of quiescing channels and disabled channels according to the current system load.

According to a modified method, in step 205, rather than selecting the channels for quiescing at random, if there are any idle enabled channels, these are selected first for quiescing, and as they are already idle they are disabled, so that they do not receive any further calls which would increase the system load further. In another option, all idle channels are disabled and then N−Q active channels are marked for disablement.

Referring to FIGS. 3a to 3d, use of the method will now be described in relation to a simplified embodiment in which there are twelve channels, numbered 1-12. The channel controller 22 can read the state of each channel via the interface 24, i.e., whether a channel is active, idle or disabled. The channel controller can mark an active channel as quiescing and will ensure that when a call on a marked channel ends the channel is disabled. Tables are used in FIGS. 3a to 3d to show the state of each channel as A, Q or D, during four iterations of the preferred embodiment of the method. A is an active, unmarked channel; Q is an active channel marked as quiescing; and D is a disabled channel. Each figure shows two tables, the leftmost table showing the channel states before method steps 204 or 206 are carried out, and the rightmost table showing the channel states after steps 204 to 210 have been carried out as appropriate.

FIG. 3a shows the states when the method is carried out at a time $t_1$. All twelve channels are active and unmarked, thus the number of currently quiescing channels, Q, is zero. In step 202 the system determines that the number of channels required to be quiesced, N, is 4, so four of the channels are marked for disablement, in this case channels 1, 7, 9 and 11 are chosen randomly and marked 'Q' for disablement. The method then waits a predetermined time W before repeating the method steps.

So FIG. 3b shows states of the channels when the method is next carried out at a time $t_1+W$. During the waiting time W, three of the channels marked for disablement at time $t_1$ have ended their calls and disabled, namely channels 1, 9 and 11. As shown in FIG. 3b, channel 7 is still quiescing and marked for disablement. At this time the system load is such that the number of channels required to be quiesced, N=−2. This means that 2 channels are to be enabled and step 204 is to be carried out. So quiescing channel 7 is unmarked, becoming active, A, once again, and two of the disabled channels, here channels 1 and 9, are enabled. At this point there are no quiescing channels and one disabled channel.

At time $t_1+2W$ (FIG. 3c), the states of the channels has not altered (there were no quiescing channels that might have disabled), and the number of channels required to be quiesced, N, is determined to be 6. As initially there are zero quiescing channels, six active channels are quiesced, here channels 1 to 6.

At time $t_1+3W$ (FIG. 3d), channels 2 and 4 are still quiescing, channels 1, 3, 5 & 6 having finished their calls and disabled within the wait period. In this iteration, N is determined to be −5 at step 202. So all channels which are still quiescing (e.g. 2 and 4) are unquiesced, and five disabled channels (in this case all of the disabled channels) are enabled, bringing all channels once again into active service.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The invention claimed is:

1. A method of managing voice channels in a voice response system, the method comprising:
    monitoring a utilization level of a system resource by a monitor;
    determining to quiesce a number of voice channels based on the utilization level of said system resource;
    selecting one or more channels for quiescing;
    disabling a quiescing channel when it becomes inactive;
    periodically determining a number, N, of the voice channels which should be quiesced based on the utilization level of said system resource;
    comparing a number of selected channels currently quiescing, Q, with the number, N, that should be quiesced based on the utilization level of said system resource;
    adjusting the number of quiescing channels based on the comparison; and unselecting Q−N quiescing channels if Q>N.

2. A method of managing voice channels in a voice response system, the method comprising:
    monitoring a utilization level of a system resource by a monitor;
    determining to quiesce a number of voice channels based on the utilization level of said system resource;
    selecting one or more channels for quiescing;
    disabling a quiescing channel when it becomes inactive;
    periodically determining a number, N, of the voice channels which should be quiesced based on the utilization level of said system resource;
    comparing a number of selected channels currently quiescing, Q, with the number, N, that should be quiesced based on the utilization level of said system resource;
    adjusting the number of quiescing channels based on the comparison; and selecting N−Q channels for disablement if N>Q.

3. A voice response system for use with a plurality of voice channels, the system comprising:
    a monitor for monitoring a utilization level of a system resource; and
    a channel controller operable to periodically determine a number, N, of the voice channels to quiesce based on the utilization level of said system resource, by comparing a number of channels currently quiescing, Q, with N, adjusting the number of quiescing channels based on the comparison, and disabling a quiescing channel when it becomes inactive, and wherein the channel controller is operable to unmark Q−N quiescing channels marked for disablement if Q>N.

4. A voice response system for use with a plurality of voice channels, the system comprising:
- a monitor for monitoring a utilization level of a system resource;
- a channel controller operable to periodically determine a number, N, of the voice channels to quiesce based on the utilization level of said system resource, by comparing a number of channels currently quiescing, Q, with N, adjusting the number of quiescing channels based on the comparison, and disabling a quiescing channel when it becomes inactive, and wherein the channel controller is operable to mark N−Q channels for disablement if N>Q.

* * * * *